US012089781B2

(12) United States Patent
Palmer, Jr.

(10) Patent No.: US 12,089,781 B2
(45) Date of Patent: Sep. 17, 2024

(54) REMOVABLE FOOD INFUSER FOR A GRILL ASSEMBLY

(71) Applicant: Larry Palmer, Jr., Jupiter, FL (US)

(72) Inventor: Larry Palmer, Jr., Jupiter, FL (US)

( * ) Notice: Subject to any disclaimer, the term of this patent is extended or adjusted under 35 U.S.C. 154(b) by 769 days.

(21) Appl. No.: 17/237,727

(22) Filed: Apr. 22, 2021

(65) Prior Publication Data

US 2021/0330123 A1 Oct. 28, 2021

Related U.S. Application Data

(60) Provisional application No. 63/013,883, filed on Apr. 22, 2020.

(51) Int. Cl.
*A47J 37/07* (2006.01)
*A47J 37/06* (2006.01)

(52) U.S. Cl.
CPC ....... *A47J 37/0786* (2013.01); *A47J 37/0694* (2013.01)

(58) Field of Classification Search
CPC .......................... A47J 37/0694; A47J 37/0786
USPC ........................................................ 99/324
See application file for complete search history.

(56) References Cited

U.S. PATENT DOCUMENTS

| | | | | |
|---|---|---|---|---|
| 4,732,137 A | * | 3/1988 | Parsons | A47J 37/0786 99/347 |
| 2006/0068067 A1 | * | 3/2006 | Zimmerman | A23L 5/12 426/281 |
| 2006/0222741 A1 | * | 10/2006 | Flood | A23B 4/28 426/106 |
| 2011/0226135 A1 | * | 9/2011 | Oswald | A47J 27/04 99/473 |
| 2016/0206132 A1 | * | 7/2016 | Chen | B01F 35/712 |

* cited by examiner

*Primary Examiner* — Dana Ross
*Assistant Examiner* — Joseph W Iskra
(74) *Attorney, Agent, or Firm* — Mark C. Johnson; Johnson | Dalal

(57) ABSTRACT

A removable infuser for a grill assembly allowing for the continued infusion of food products throughout the duration of the cooking process, the assembly comprising a tray body, a plurality of legs, at least one infusion plug operably configured to moderate the quantity of infusion liquid being infused into a food product, and at least one liquid-injection member inserted directly into the food product to fluidly transport and infuse the infusion liquid into the food product.

20 Claims, 12 Drawing Sheets

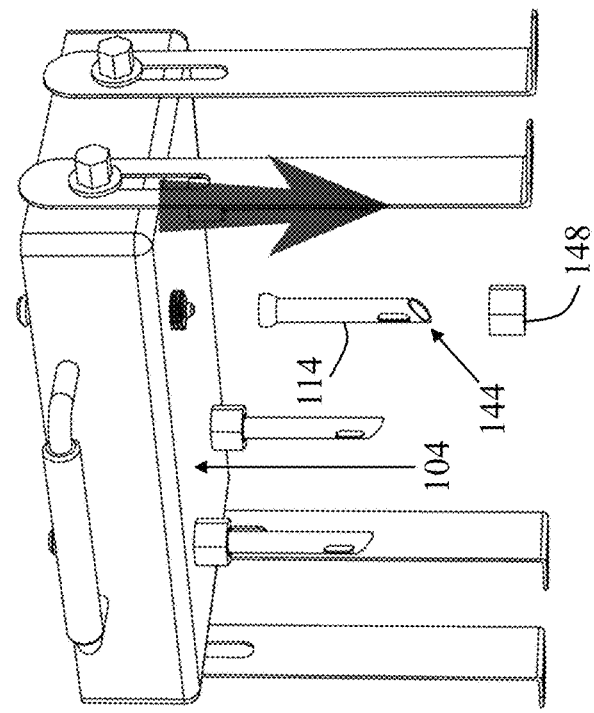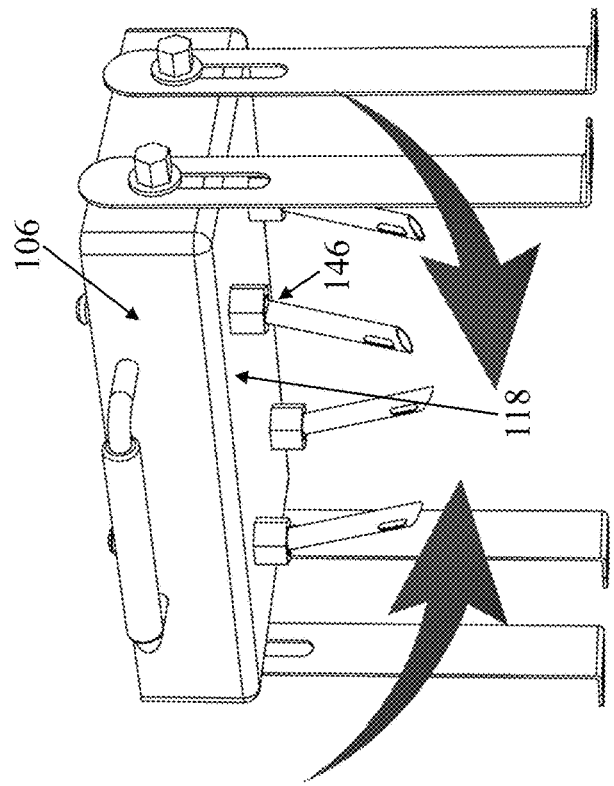
FIG. 5

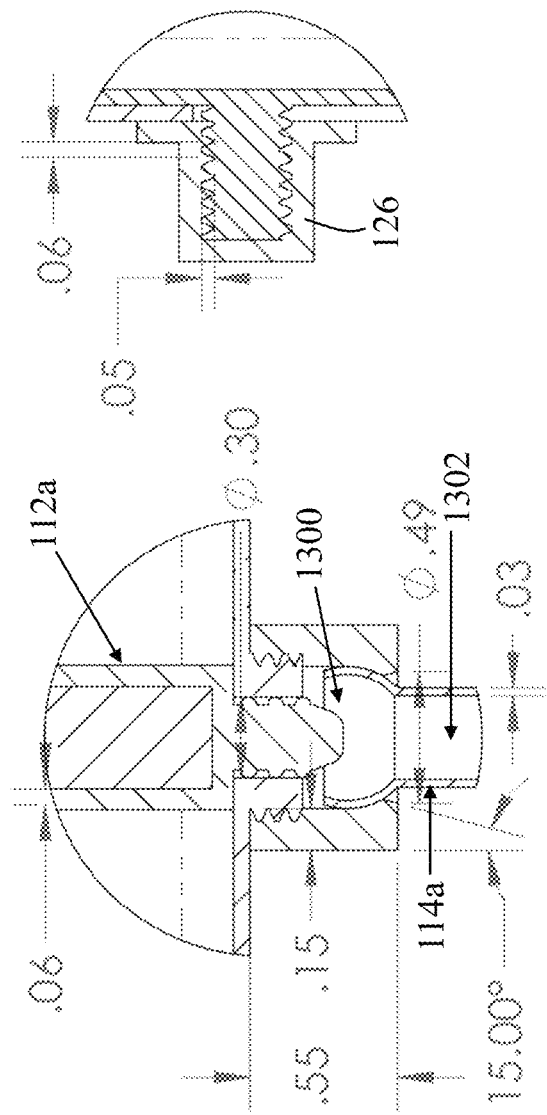

REMOVABLE FOOD INFUSER FOR A GRILL ASSEMBLY

FIELD OF THE INVENTION

The present invention relates generally to cookware and grilling aids, and, more particularly, relates to a removable food infuser for a grill assembly.

BACKGROUND OF THE INVENTION

Though the market features a plethora of food ingredients, marinades, herbs, spices, and sauces designed to add personalized flavors to food products, there are not many practical and efficient devices or assemblies for infusing said flavors into the food products. This is particularly applicable for food products a user desires to cook via a grill, smoker, etc. Generally, flavor infusion into food is accomplished using marinade injectors which do not accommodate large quantities of infusion liquid, thereby requiring repeated applications throughout the duration of the cooking process, and which require a user's active manipulation such that the marinade injector is not operably configured to continuously and automatically release a continued stream of infusion liquid into the food product throughout the duration of the cooking process. The smaller dimensions and limited capacity of the marinade injector's storage cavity further restrict flavor infusion to substantially fluid or liquid formulations. Aside from use of marinade injectors, flavor infusion can be accomplished by marinating the food products for several hours in liquid or solid infusion mixes, e.g., covering the outside surface of the food products in the solid infusion mix or soaking it in the liquid infusion mix. Limitations, however, include an inability to penetrate the food product and internally infuse the flavors directly into the inside of the food product and the need for a significant period of time to elapse with the food product in the infusion mix, generally upwards of three hours, before the flavor is sufficiently infused and the food product can be cooked.

Therefore, a need exists to overcome the problems with the prior art as discussed above.

SUMMARY OF THE INVENTION

The invention provides a removable food infuser for a grill assembly that overcomes the hereinafore-mentioned disadvantages of the heretofore-known devices and methods of this general type and that provides a practical and efficient device used to infuse flavors into a food item while simultaneously cooking the food item. The present invention is operably configured to automatically release a controlled but continued stream or flow of infusion liquid into the food item throughout the duration of the cooking process, obviating the need for periodic manual applications of the infusion liquid onto the food product by a user.

With the foregoing and other objects in view, there is provided, in accordance with the invention, a removable infuser for a grill assembly comprising a tray body having a bottom wall with an upper surface, a lower surface opposing the upper surface, and defining at least one infusion plug aperture thereon, and a sidewall surrounding the bottom wall, the tray body and the sidewall defining a tray cavity; a plurality of legs coupled to the tray body and each having a lower support surface and a leg length separating the lower support surface and the lower surface of the bottom wall; at least one infusion plug selectively removably coupled to the upper surface of the bottom wall in a watertight configuration and disposed within the at least one infusion plug aperture; and at least one liquid-injection member coupled to the bottom wall, with a lower end, an upper end defining an upper aperture, an injector length separating the lower and upper ends of the least one liquid-injection member, an injection channel spanning along the injector length and fluidly coupled to the upper aperture, and defining at least one liquid-emission aperture thereon that is fluidly coupled to the injection channel and fluidly couplable to the at least one infusion plug aperture, the least one liquid-injection member operably configured to selectively rotate 360° relative to the bottom wall of the tray body.

In accordance with a further feature of the present invention, one of the plurality of legs is coupled to the sidewall on a left side of the tray body and another of the plurality of legs is coupled to the sidewall on a right side of the tray body, the left side of the tray body opposing the right side of the tray body and the plurality of legs each operably configured to selectively rotate and selectively translate to modify the leg length.

In accordance with a further feature of the present invention, the lower support surface of each of the plurality of legs each further comprise an enclosed leg aperture defined thereon.

In accordance with the present invention, an embodiment of the present invention includes a grill rack with a plurality of grill rack members of a substantially rigid material and defining a grid defining a grill plane, with having two opposing handles, and with a first plurality of protrusion member(s) disposed proximal to one of the two opposing handles and a second plurality of protrusion members disposed proximal to other of the two opposing handles, the first and second plurality of protrusion members each disposed in an upright orientation with respect to the grill plane and shaped and sized to be received within the enclosed leg aperture of each of the plurality of legs.

In accordance with another feature, the first plurality of protrusion members are disposed in an axially aligned configuration and the second plurality of protrusion members are disposed in an axially aligned configuration parallel to the axially aligned configuration of the first plurality of protrusion members.

In accordance with yet another feature of the present invention, the plurality of legs are each selectively rotatably coupled to the tray body to define a leg rotation path and selectively, linearly, and translatably coupled to the tray body to define a leg translation path, the plurality of legs each operably configured to be selectively locked in a rotational position along the leg rotation path and an adjusted length position along the leg translation path with a leg fastener.

In accordance with a further feature of the present invention, the at least one infusion plug 112a-n further comprises a lower end, an upper end, and a plug length separating the lower and upper ends of the infusion plug, the plug length is approximately equal to or greater than a sidewall height separating the upper surface of the bottom wall and an upper edge of the sidewall.

In accordance with yet another feature of the present invention, the at least one infusion plug 112a-n further comprises a plurality gripping ridges disposed proximal to the upper end of the at least one infusion plug.

In accordance with a further feature of an exemplary embodiment of the present invention, the lower end of the at least one liquid-injection member tapers in thickness to a point.

In accordance with another feature, the upper end of the at least one liquid-injection member forms part of a spherical shape, further comprising an injector fastener with an inner concave surface coupled to the spherical shape of the at least one liquid-injection member, the injector fastener selectively removably coupled to the bottom wall of the tray body in a threaded configuration.

In accordance with the present invention, an embodiment of the present invention includes an injector length that is less than the leg length.

In accordance with the present invention, an embodiment of the present invention includes at least four infusion plugs selectively removably coupled to the upper surface of the bottom wall in the watertight configuration and disposed within at least four infusion plug apertures, the at least four infusion plugs disposed in an equally spaced apart configuration; and at least four liquid-injection members each coupled to the bottom wall and each having at least one liquid-emission aperture thereon that is fluidly coupled to the injection channel and fluidly couplable to one of the at least four infusion plug apertures, the least four liquid-injection members operably configured to selectively rotate 360° relative to the bottom wall of the tray body.

In accordance with another embodiment of the present invention, the removable infuser for a grill assembly comprises a tray body having a bottom wall with an upper surface, a lower surface opposing the upper surface, and defining at least one infusion plug aperture thereon, and a sidewall surrounding the bottom wall, the tray body and the sidewall defining a tray cavity; a plurality of legs coupled to the tray body and each having a lower support surface and a leg length separating the lower support surface and the lower surface of the bottom wall; at least one infusion plug coupled to the upper surface of the bottom wall in a watertight configuration and disposed within the at least one infusion plug aperture; and at least one liquid-injection member coupled to the bottom wall, with a lower end, an upper end defining an upper aperture, an injector length separating the lower and upper ends of the least one liquid-injection member, an injection channel spanning along the injector length and fluidly coupled to the upper aperture, and defining at least on liquid-emission aperture thereon that is fluidly coupled to the injection channel and fluidly couplable to the at least one infusion plug aperture, the least one liquid-injection member operably configured to selectively rotate 360° relative to the bottom wall of the tray body.

In accordance with a further feature of the present invention, the at least one infusion plug is selectively removably coupled to the upper surface of the bottom wall.

Although the invention is illustrated and described herein as embodied in a removable food infuser for a grill assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the liquid-injection member(s).

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 5 are perspective views of a removable food infuser for a grill assembly depicting the operable movement and detachment of liquid-injection members, in accordance with another embodiment of the present invention;

FIG. 13 is a close-up view of a liquid-injection member and an infusion plug, in accordance with an exemplary embodiment of a removable food infuser for a grill assembly;

FIG. 14 is a close-up view of a sidewall of the tray body, leg, and leg fastener coupled together, in accordance with an exemplary embodiment of a removable food infuser for a grill assembly;

DETAILED DESCRIPTION OF INVENTION

Figure 1:
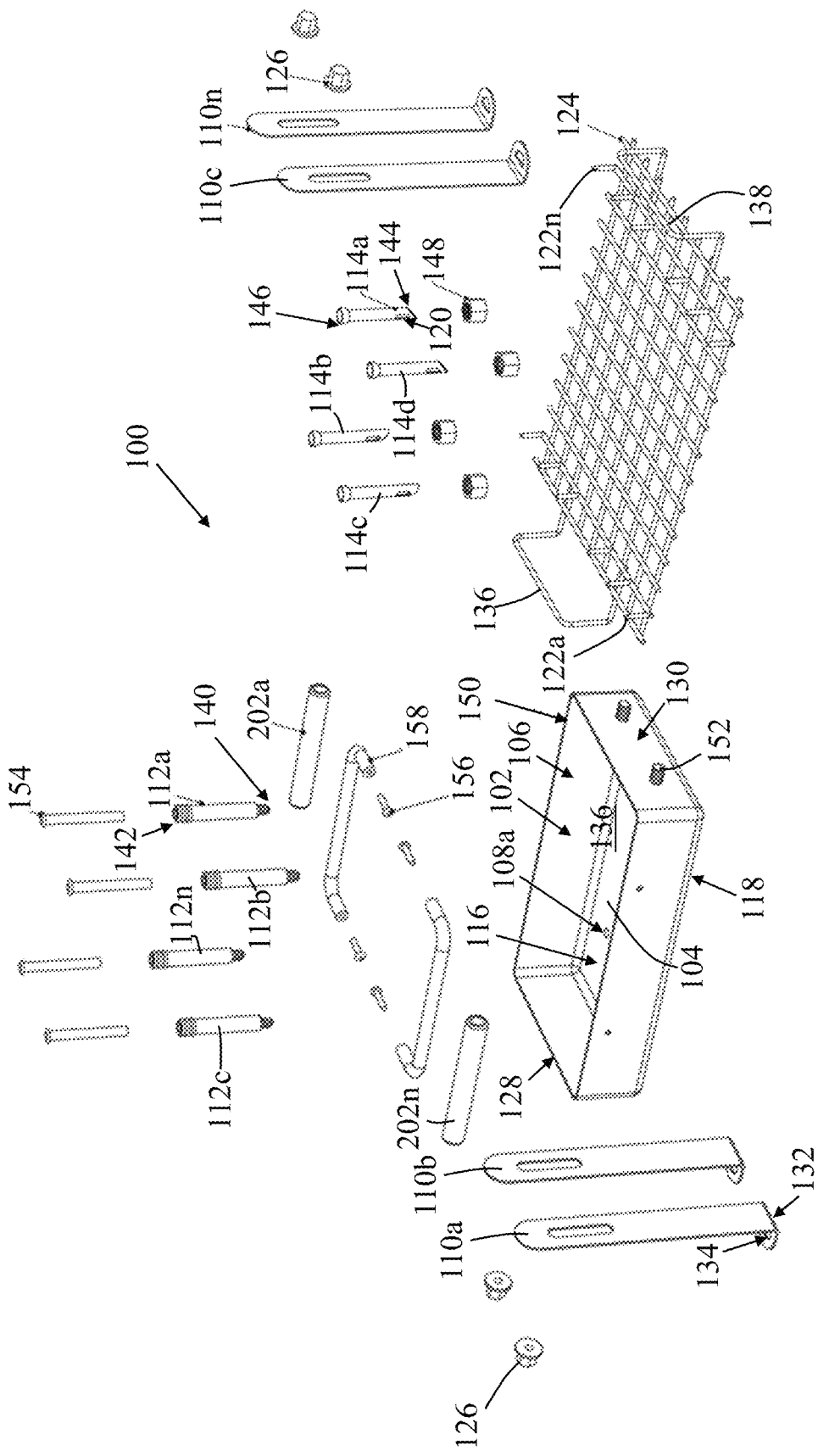
FIG. 1 is an exploded view of a removable food infuser for a grill assembly, in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient selectively removable infuser for a grill assembly that overcomes known disadvantages of those known devices and methods of this general type and that effectively, efficiency, and safely infuses food in a grill assembly. Embodiments of the invention provide a portable and removable infuser for a grill assembly which can beneficially be used in conjunction with a variety of cooking devices such as, by way of example and without limitation, conventional ovens, grills, barbecues, etc. In addition, embodiments of the invention provide users the ability to inject an infusion liquid into their food products while the food products are being cooked and to selectively adjust the amount of infusion liquid that is continuously and automatically injected into the food product without any continued manual manipulation by the user.

Referring now to FIG. 1, one embodiment of the present invention is shown in an exploded view. FIG. 1 shows several advantageous features of the present invention, but, as will be described below, the invention can be provided in several shapes, sizes, combinations of features and components, and varying numbers and functions of the components. The first example of a removable infuser for a grill assembly 100 (herein referred to as "infuser 100" for brevity), as shown in the figures, includes a tray body 102, a plurality of legs 110a-n (wherein "n" represents any number greater than one), at least one infusion plug 112a-n may be operably configured to be removed from the tray body 102 to allow or control the flow of liquid into a food substance and/or house a liquid configured to infuse a food substance (e.g., meat, fish, etc.) with said liquid. The infusing liquid is transported to the food substance with one or more liquid-injection member(s) 114a-n. As discussed further herein and as depicted in the figures, the liquid (which may be marinade, seasoning ingredients such as herbs, vegetables, and/or other liquid) is housed within the tray body 102 and infused into the food substance through the at least one liquid-injection member 114a-n.

In accordance with the present invention, the tray body 102 has a bottom wall 104 with an upper surface 116, a lower surface 118 opposing the upper surface 116, and defining at least one infusion plug aperture 108a-n thereon, and a sidewall 106 surrounding the bottom wall 104, the tray body 102 and the sidewall 106 define a tray cavity 136. In an exemplary embodiment, the lower and upper surfaces 116, 118 are substantially planar, wherein "planar" is defined as relating to or in the form of a plane or having an approximately level surface to prevent liquid from pooling or shifting to a particular side of the surface. By having a substantially planar and level surface, the lower and upper surfaces 116, 118 facilitate an equal distribution of the infusion contents within the tray cavity 136 which, in turn, allows the infusion contents to travel in equal proportions and quantities through the at least one liquid-injection member 114a-n given that the infusion fluid may be gravity-fed to the food product in one embodiment, particularly where the infusion contents are primarily liquid in form. The sidewall 106 may completely surround the bottom wall 104 to beneficially retain the infusion liquid and/or solid contents within the tray cavity 136, preventing inadvertent spillage or leakage of the infusion liquid and/or solid contents. In a preferred embodiment, the tray body 102, the plurality of legs 110a-n, the at least one infusion plug 112a-n, and the at least one liquid-injection member 114a-n are of a substantially heat-resistant material composition wherein "heat-resistant" is defined as capable of withstanding temperatures of at least 700° F. (371° C.) without plastic deformation, failure, or reaching the material's melting point. This heat-resistant quality ensures that the infuser 100 can reliably and repeatedly be used in grilling assemblies, conventional ovens, and similar cooking equipment where internal temperatures often reach 500-700° F. (260-371° C.). In a preferred embodiment, the tray body 102 has dimensions of approximately 10 inches (25.4 centimeters) by 6 inches (15.24 centimeters) to provide a space that is sufficiently large to comfortably fit the infusion contents, whether liquid or solid, within the tray cavity 136. The tray body 102 may further comprise a tray lid having dimensions proportionately corresponding to the dimensions of the tray body 102, i.e., approximately 10 inches (25.4 centimeters) by 6 inches (15.24 centimeters), the lower surface of the tray lid operably configured to partially or completely cover the tray cavity 136 when resting on the upper edge 150 of the sidewall 106. Placement of a tray lid over the tray cavity 136 aids in simmering, smoking, or otherwise cooking the infusion contents housed within the tray cavity 136 during use, particularly where the infusion contents consist of solid vegetables, starches, or other edible products. Placement of a tray lid over the tray cavity 136 may further facilitate a stronger or more potent infusion of the food products located on the grill rack 124.

Figure 4:
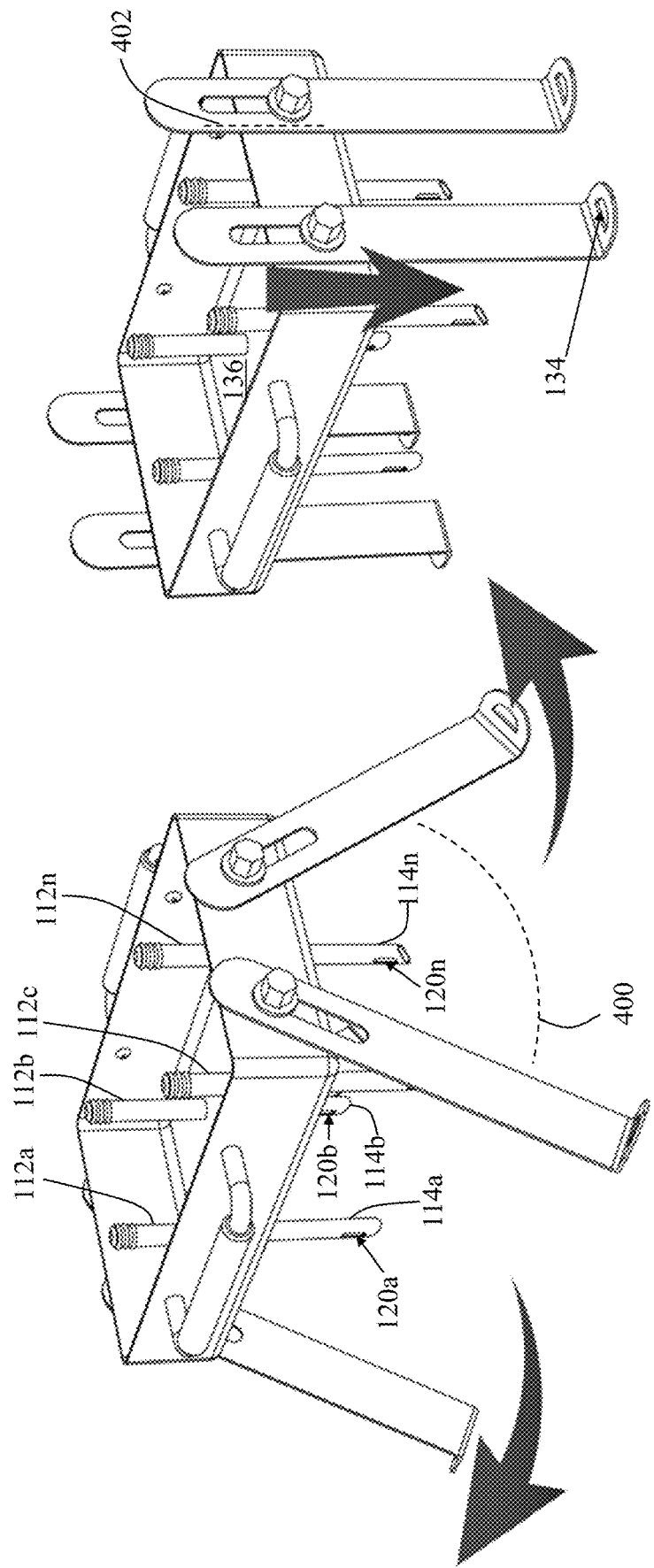
FIG. 4 are perspective side views of a removable food infuser for a grill assembly depicting the operable movement of legs, in accordance with another embodiment of the present invention.
Figure 6:
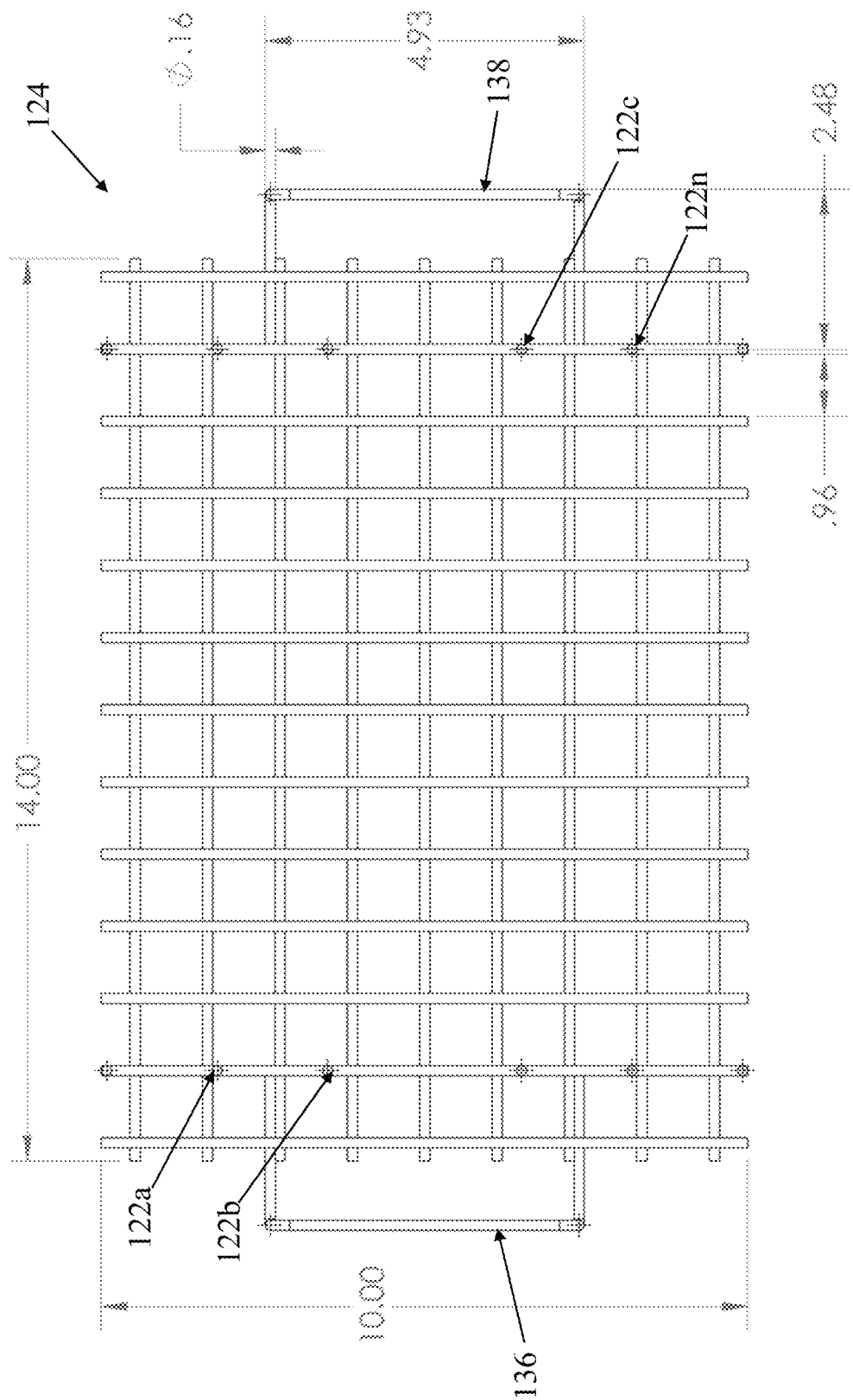
FIG. 6 is an elevational top view of a grill rack, in accordance with an exemplary embodiment of a removable food infuser for a grill assembly.
Figure 7:
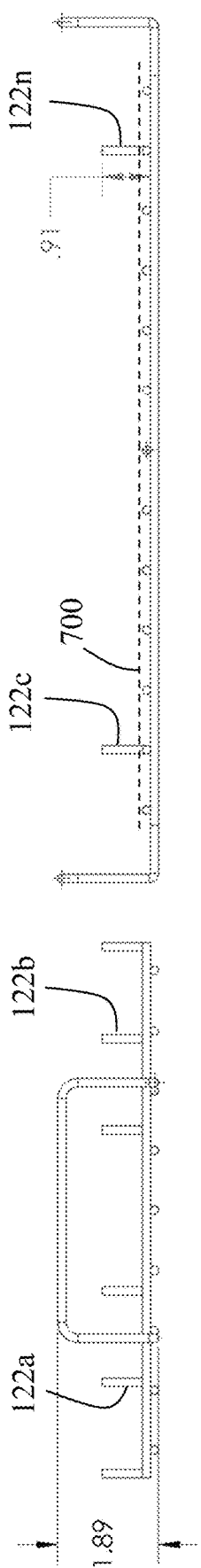
FIG. 7 are elevational side and front views of a grill rack, in accordance with an exemplary embodiment of a removable food infuser for a grill assembly.
Figure 8:
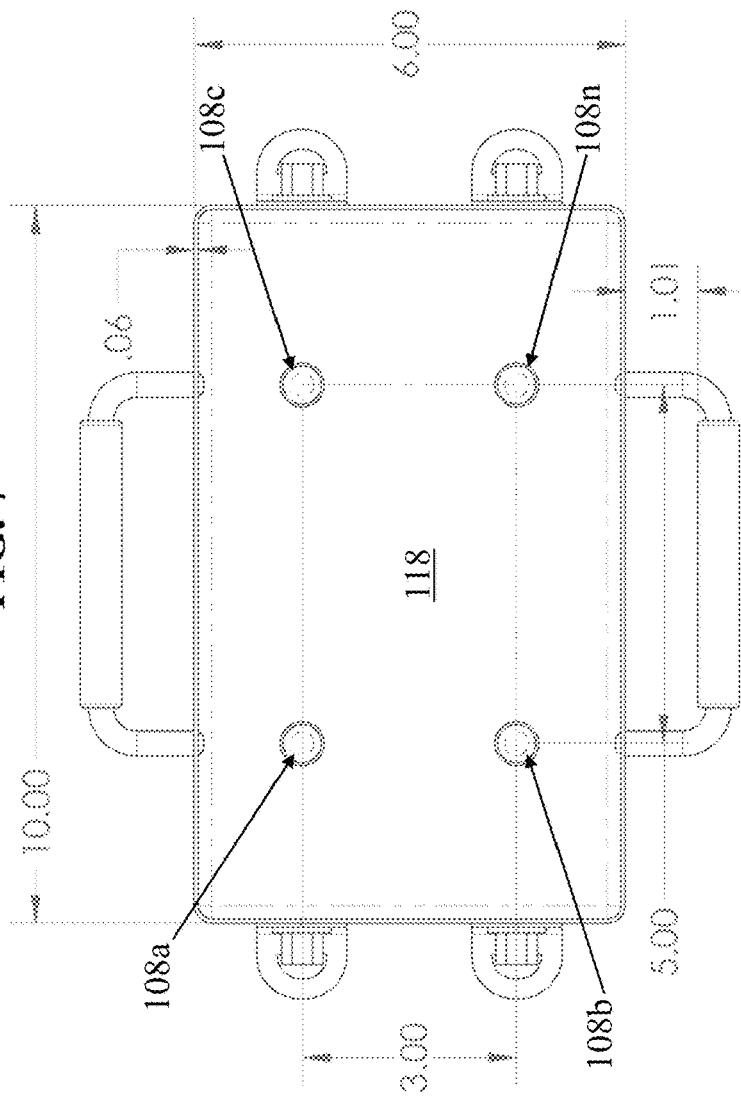
FIG. 8 is a top plan view of a tray body, in accordance with an exemplary embodiment of a removable food infuser for a grill assembly.
Figure 9:
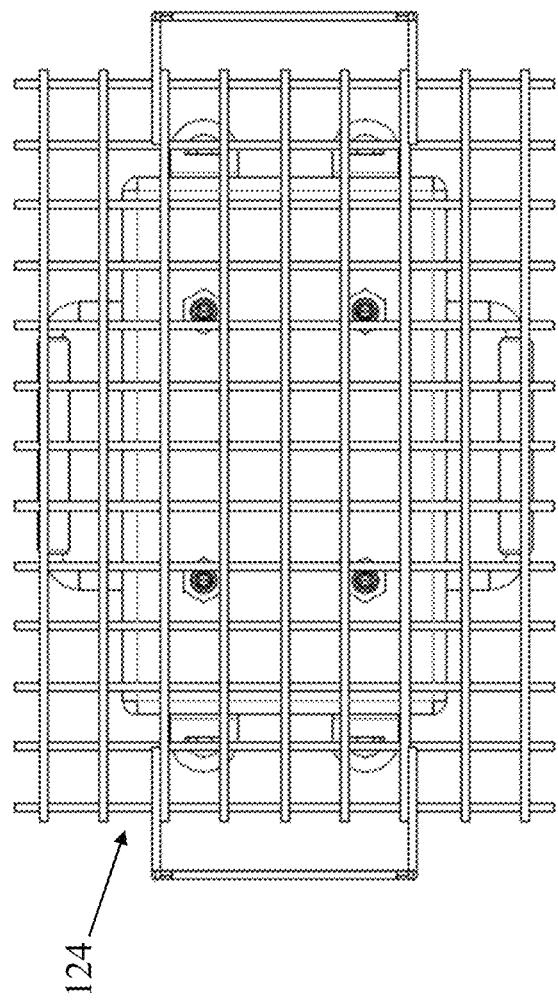
FIG. 9 is a bottom plan view of a removable food infuser for a grill assembly, in accordance with an exemplary embodiment of the present invention.
Figure 10:
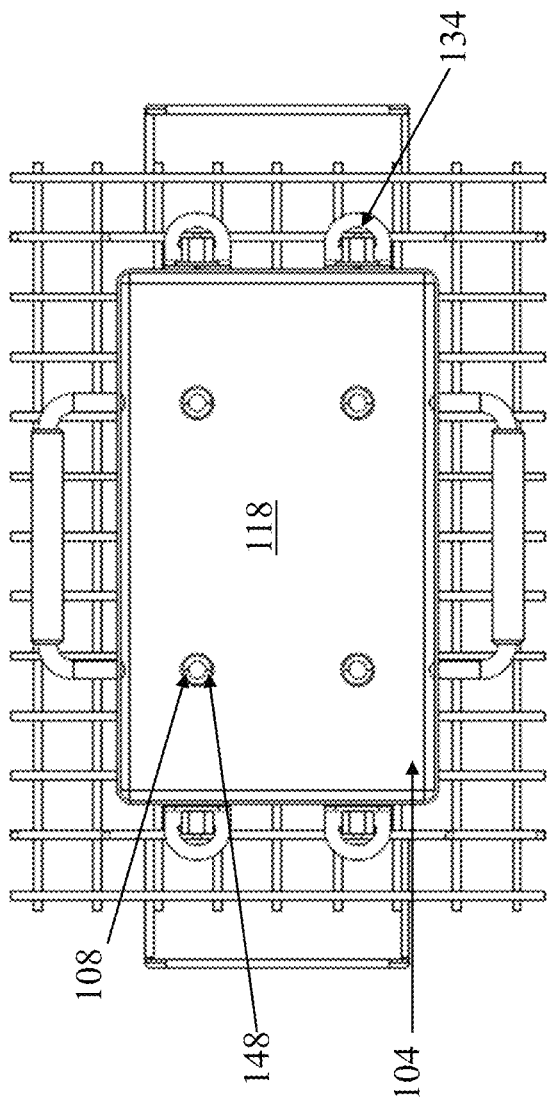
FIG. 10 is a top plan view of the removable food infuser for a grill assembly in FIG. 9.
Figure 12:
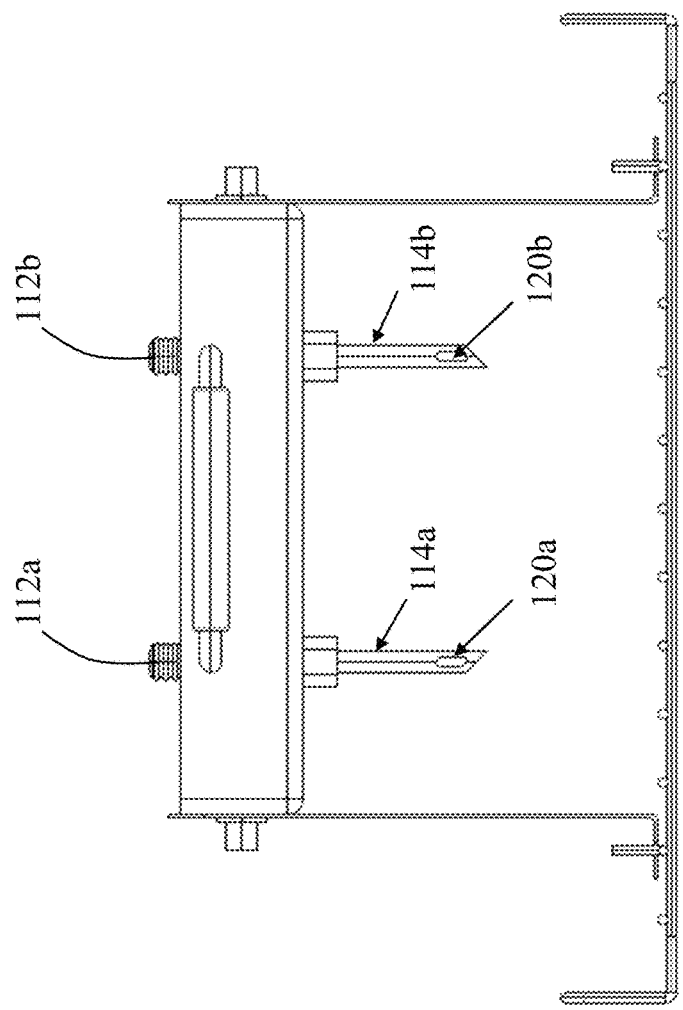
FIG. 12 is an elevational rear view of the removable food infuser for a grill assembly in FIG. 11.
Figure 11:
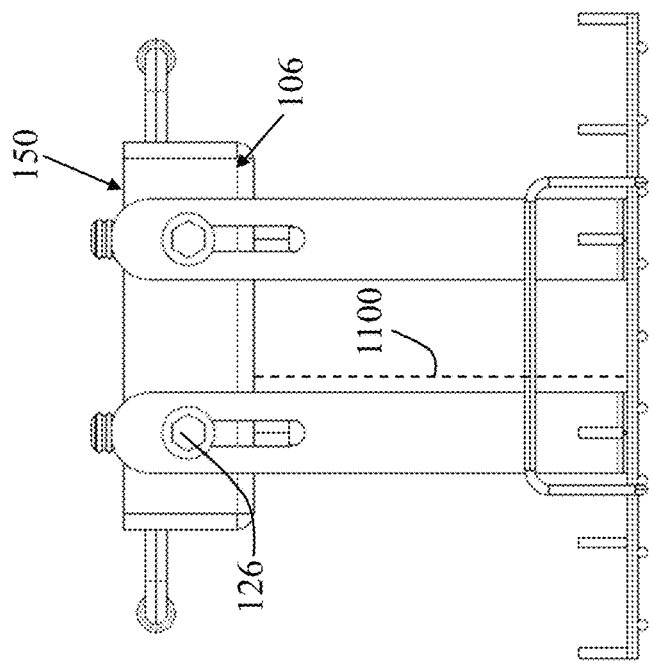
FIG. 11 is an elevational side view of a removable food infuser for a grill assembly, in accordance with an exemplary embodiment of the present invention.

The plurality of legs 110a-n are coupled to the tray body 102 and each have a lower support surface 132 and a leg length 1100 (best depicted in FIG. 11) separating the lower support surface 132 and the lower surface 118 of the bottom wall 104. In one embodiment, there may be two opposing legs 110a-b coupled to the tray body 102. In another embodiment, there may be four legs 110a-n coupled to the tray body 102 and the distal end of the legs 110a-d may beneficially include an enclosed leg aperture 134 defined on the lower support surface 132 of each of the plurality of legs 110a-n. In a preferred embodiment, the leg length 1100 has a minimum height or length of approximately 6 inches (15.24 centimeters) to provide sufficient room for both the food products being cooked and the plurality of liquid-injection members 114a-n. Though the specific height or length of the leg length 1100 may vary in alternate embodiments, the leg length 1100 must be of a height or length sufficient to provide clearance to the food products being cooked/infused relative to the height or length of the food products and the height or length of the plurality of liquid-injection members 114a-n. As best seen in FIG. 4, the leg length 1100 may be adjusted or modified by selectively rotating or translating the plurality of legs 110a. In one embodiment, one of the plurality of legs 110a is coupled to the sidewall 106 on a left side 128 of the tray body 102 and another of the plurality of legs 110c is coupled to the sidewall 106 on a right side 130 of the tray body 102, the left side 128 of the tray body 102 opposing the right side 130 of the tray body 102 and the plurality of legs 110a each operably configured to selectively rotate and selectively translate to modify the leg length 1100. Particularly when using the infuser 100 with a variety of grills, barbecues, ovens, and other comparable cooking equipment, the adjustability of the leg length 1100 allows the infuser 100 to beneficially achieve clearance relative to a grill surface, a hood, an upper surface of a conventional oven, etc., thereby creating a relatively broad scope and applicability of use of the infuser 100.

The tray cavity 136, in conjunction with the sidewall 106, is operably configured to house or retain infusion contents therein, wherein the infusion contents may be solid or liquid in form and may consists of a marinade, an infusing substance, or vegetables. As such, the tray cavity 136 may be fluidly coupled to the at least one infusion plug 112a-n. In one embodiment, the tray cavity 136 may hold one or more marinade or infusion food substances and/or liquids for infusion into the food substance cooked on the grate of the infuser 100.

Figure 2:
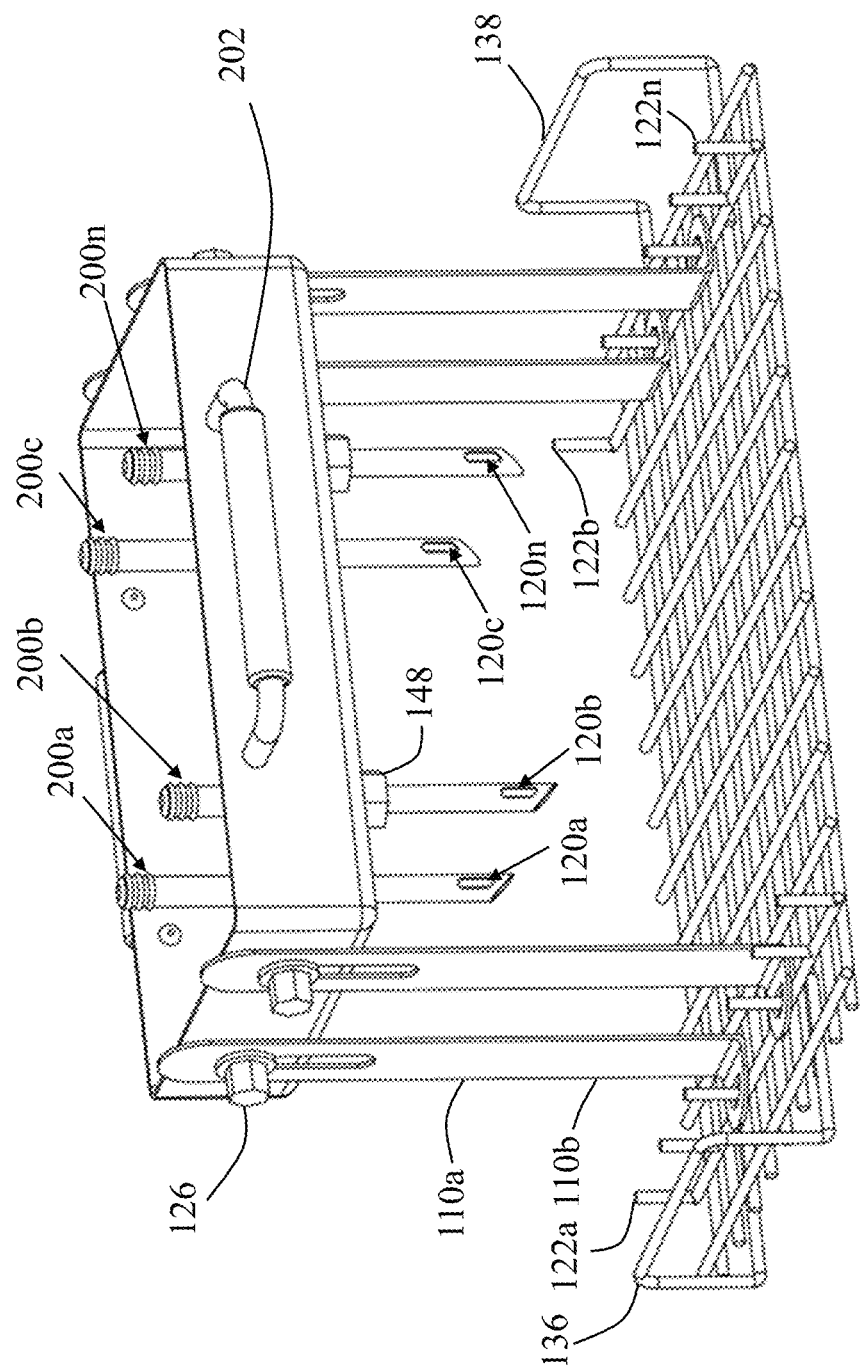
FIG. 2 is a perspective front view of a removable food infuser for a grill assembly, in accordance with the present invention.

The sidewall 106 may include one or more tray handle(s) 202a-n, as exemplified in FIGS. 1-2. The tray handles 202a-n may be disposed on opposing sides of the sidewall 106 and enable the tray body 102 to be lifted and inserted into a grill assembly or conventional oven. In one embodiment, the tray handles 202a-b are approximately 5 inches in length to beneficially provide a handle size that is easily and readily graspable by a user. In alternate embodiments, the tray handles 202a-n may further comprise a silicone rubber grip cover resistant to extreme environments and temperatures from −55 to 300° C. (−70 to 570° F.), or another comparable material having properties of low thermal conductivity and thermal stability (constancy of properties over a wide temperature range of −100 to 250° C.) and designed to prevent users from burns when handling the tray body 102. The handles 202a-n may be coupled to the tray body 102 with a fastener 156 operably configured to be inserted into an end 158 of the handle.

Figure 3:
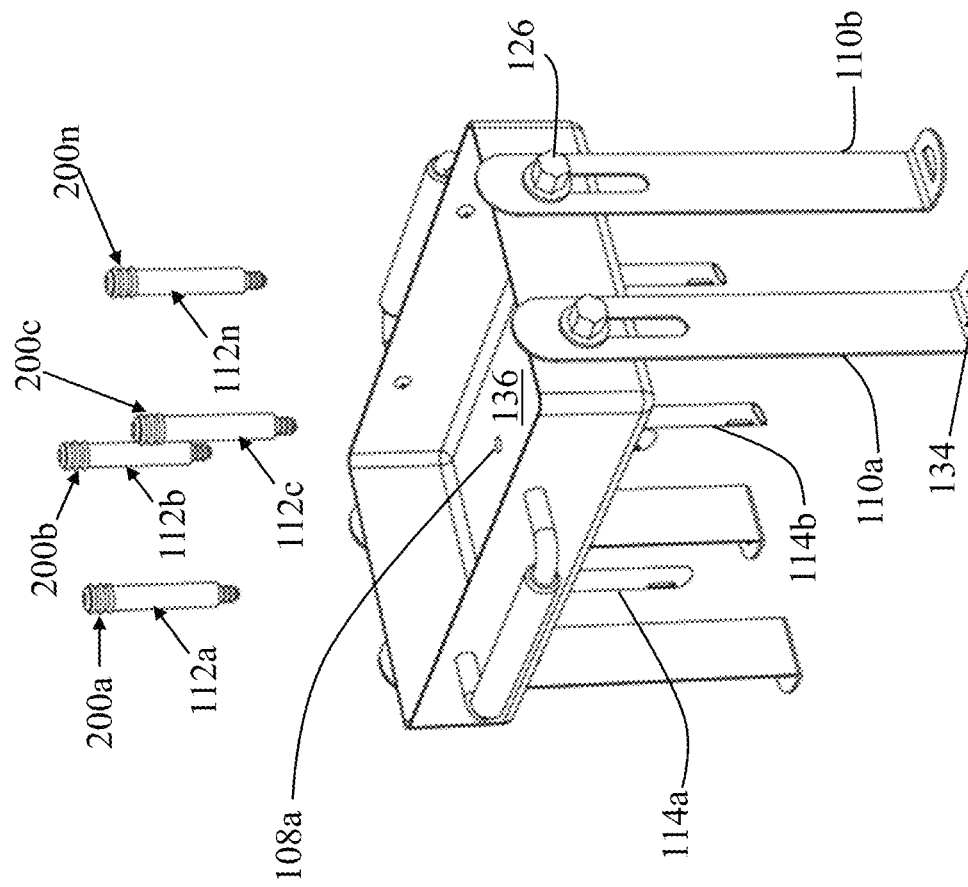
FIG. 3 is a perspective side and partially exploded view of a removable food infuser for a grill assembly, in accordance with one embodiment of the present invention.

As best seen in FIG. 1 and FIG. 3, the infuser 100 may also include one or more infusion plug(s) 112a-n that may be selectively removably coupled to the upper surface 116 of the bottom wall 104 (or another component) of the tray body 102 in a watertight configuration and disposed within the at least one infusion plug aperture 108a-n. In one embodiment, however, the plurality of infusion plug(s) 112a-n are also fluidly coupled to the at least one infusion plug aperture 108a-n. The infusion plug(s) 112 facilitate in controlling the flow of infusion contents through the infusion plug aperture 108. Specifically, in one embodiment, the infusion contents retained within the tray cavity 136 have no egress to a food product if and when the plurality of infusion plugs 112a-n are fully inserted into the plurality of infusion plug apertures 108a-n in a watertight configuration. When the plurality of infusion plugs 112a-n are fully removed from the plurality of infusion plug apertures 108a-n or, in some embodiments, loosely screwed or adjusted onto the plurality of infusion plug apertures 108a-n, however, the infusion contents (particularly where such contents are liquid in form) are provided an egress whereby the infusion contents can fluidly travel from the tray cavity 136 to the plurality of infusion plug apertures 108a-n and into the at least one liquid-injection member 114a-n where they then are infused directly into the food product itself.

In another embodiment of the present invention, the plurality of infusion plugs 112a-n and/or the plurality of infusion plug apertures 108a-n may be operably configured to comprise a valve that allows a user to selectively moderate and control the quantity or flow of infusion contents being released from the tray cavity 136 and into the food product. In one embodiment, said valve would be controlled manually at the top of the plug, electronically and/or autonomously when, for example, a desired temperature and/or time is reached within tray body or of the liquid housed therein, and/or wirelessly with a software application on a user's electronic device communicatively coupled to an electronic control valve. In a preferred embodiment, there are four infusion plugs 112a-d coupled to the bottom wall 104 of the tray body 102 and may be removably coupled thereto using a threaded configuration, a tongue-and-groove configuration, or other coupling configuration. Four infusion plugs 112a-d allow for a quantity of infusion contents sufficient to thoroughly infuse the food product to be released during the cooking process.

The one or more infusion plug(s) 112a-n may further comprise a lower end 140, an upper end 142, and a plug length separating the lower and upper ends 140, 142 of the infusion plug 112, the plug length being approximately equal to or greater than a sidewall height separating the upper surface 116 of the bottom wall 104 and an upper edge 150 of the sidewall 106. An exemplary plug length of the plurality of infusion plugs 112a-n ranges between approximately 2 inches (5.08 centimeters) and 3 inches (7.62 centimeters) to provide for infusion plugs 112 that are equal to or greater than the length or height of the tray cavity 136, i.e., the sidewall height separating the upper surface 116 of the bottom wall 104 and an upper edge 150 of the sidewall

106. By being at least as high as the length or height of the tray cavity 136, the infusion plugs 112 are more easily accessed and manipulated by a user as needed and are not completely submerged by the infusion contents housed within the tray cavity 136. This feature beneficially prevents a user from being burned by the hot infusion contents, particularly when the infusion plugs 112 are being manipulated or adjusted by a user during the cooking process (to adjust the level of infusion into the food products) or immediately thereafter when the food products and infusion contents remain very hot. To further prevent injury to a user, the one or more infusion plug(s) 112*a-n* may further comprise a plurality of gripping ridges 200*a-n* (best depicted in FIGS. 2-3) disposed proximal to the upper end 142 of the at least one infusion plug 112*a-n*. The plurality of gripping ridges 200*a-n* may be of a substantially heat-resistant silicone rubber grip cover resistant to extreme environments and temperatures from −55 to 300° C. (−70 to 570° F.), or another comparable material having properties of low thermal conductivity and thermal stability (constancy of properties over a wide temperature range of −100 to 250° C.) and designed to prevent users from burns when handling the at least one infusion plug 112*a-n*.

As shown in FIGS. 1-5, FIG. 12, and FIG. 16, the infuser 100 further comprises the at least one liquid-injection member 114*a-n* coupled to the bottom wall 104, with a lower end 144, an upper end 146 defining an upper aperture 1300, an injector length separating the lower and upper ends 144, 146 of the at least one liquid-injection member 114*a-n*, an injection channel 1302 spanning along the injector length and fluidly coupled to the upper aperture 1300, and defining at least one liquid-emission aperture 120 thereon that is fluidly coupled to the injection channel 1302 and fluidly couplable to the at least one infusion plug aperture 108*a-n*. The one or more liquid-injection member(s) 114*a-n* may be beneficially operably configured to selectively rotate approximately 360° relative to the bottom wall 104 of the tray body 102. In another embodiment, the liquid-injection member(s) 114*a-n* are not operably configured to rotate 360°. The plurality of liquid-injection member(s) 114*a-n* are operably configured to facilitate infusion of the food products by fluidly moving the infusion contents through the injection channel 1302 and into the food products via the lower end 144 and the plurality of infusion plug apertures 108*a-n* which, during use, are selectively inserted and embedded into the food products. The injector length is less than the leg length 1100 to enable the plurality of liquid-injection members 114*a-n* to be selectively inserted into the food products and the plurality of legs 110*a-n* to support and maintain the infuser 100 in a stable, upright position.

In accordance with a further feature of the present invention, the infuser 100 may further comprise a grill rack 124 with a plurality of grill rack members of a substantially rigid material and defining a grid defining a grill plane 700, with having two opposing handles 136, 138, and with a first plurality of protrusion member(s) 122*a-n* disposed proximal to one of the two opposing handles 136, 138 and a second plurality of protrusion members 122*a-n* disposed proximal to other of the two opposing handles 136, 138. The first and second plurality of protrusion members 122*a-n* may each be disposed in an upright orientation with respect to the grill plane 700 and shaped and sized to be received within the enclosed leg aperture 134 of each of the plurality of legs 110*a-n*. As used herein, the term "proximal" is defined as being directly adjacent to or at least within approximately 10% of the overall width spanning from side-to-side of the grill rack 124. In one embodiment, the first and second plurality of protrusion members 122*a-n* are permanently disposed in an upright orientation such as, by way of example and without limitation, via welding. In another embodiment, the first and second plurality of protrusion members 122*a-n* are selectively and operably configured to be oriented in said upright orientation whereby the first and second plurality of protrusion members 122*a-n* may be placed flat when not in use to conserve storage space and facilitate greater portability, and positioned in an upright orientation when in use to prevent the free movement of the tray body 102 and legs 110*a-n*. In one embodiment, the first plurality of protrusion members 122*a-n* are disposed in an axially aligned configuration and the second plurality of protrusion members 122*a-n* are disposed in an axially aligned configuration parallel to the axially aligned configuration of the first plurality of protrusion members 122*a-n*. The axially aligned parallel configuration of the first and second plurality of protrusion members 122*a-n* is designed to dimensionally reflect the size, shape, dimensions, and configuration of the plurality of legs 110*a-n* so that each of the enclosed leg apertures 134 on each of the plurality of legs 110*a-n* aligns over a corresponding protrusion member 122*a* during use. In an exemplary embodiment, the spatial distance between the first and second plurality of protrusion members 122*a-n* may be approximately 10 inches (25.4 centimeters), i.e., approximately equal to the width of the tray body 102. The first and second plurality of protrusion members 122*a-n* prevent movement of the tray body 102 and legs 110*a-n* when coupled thereto, thereby enabling the tray body 102 to maintain its desired orientation.

Figure 15:
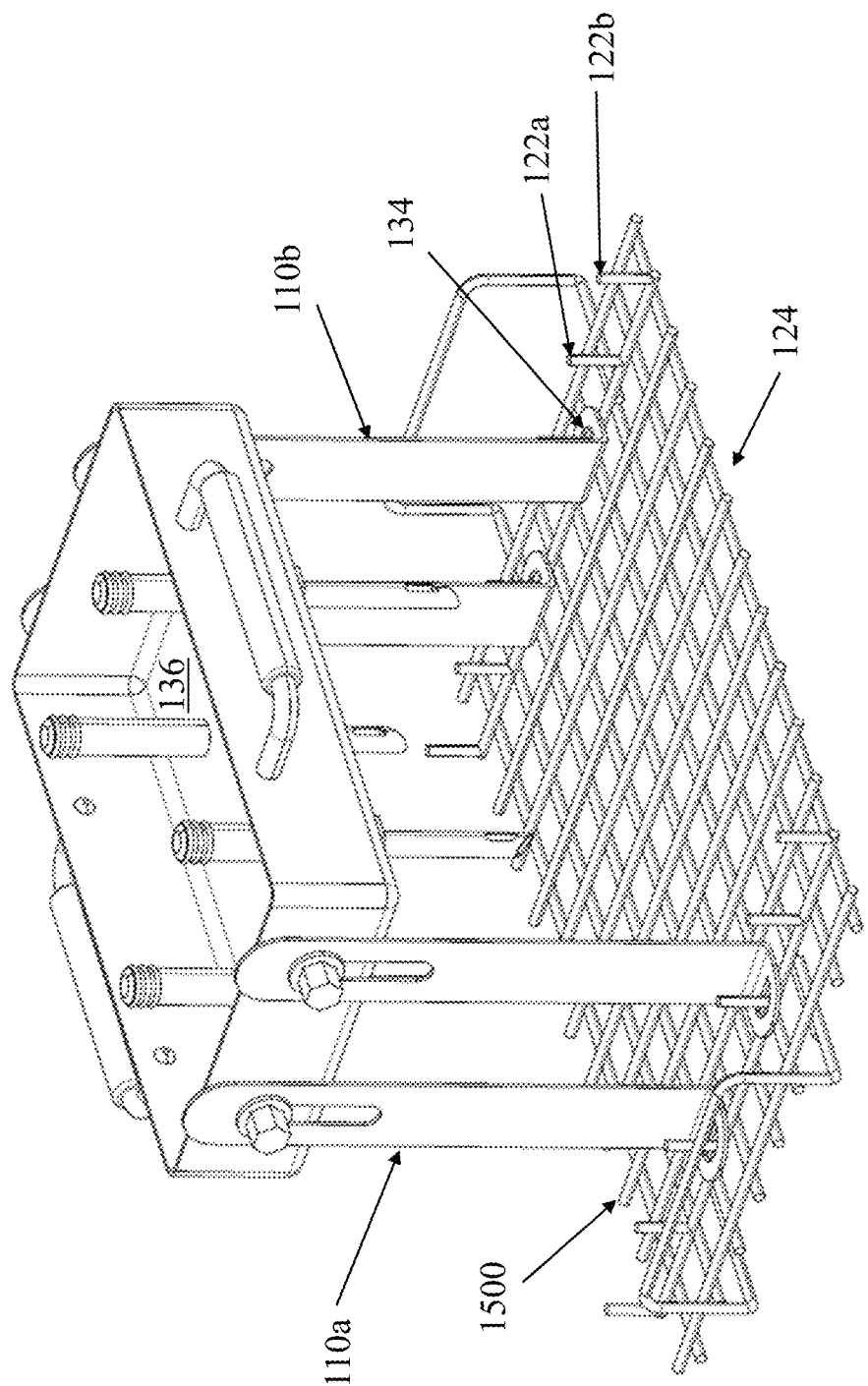
FIG. 15 is a perspective top view of a removable food infuser for a grill assembly, in accordance with an exemplary embodiment of the present invention.

As seen best in FIG. 4 and FIGS. 14-15, the plurality of legs 110*a* are each selectively rotatably coupled to the tray body 102 to define a leg rotation path 400 and selectively, linearly, and translatably coupled to the tray body 102 to define a leg translation path 402. The plurality of legs 110*a* each operably configured to be selectively locked in a rotational position along the leg rotation path 400 and an adjusted length position along the leg translation path 402 with a leg fastener 126. As used herein, "selectively" is defined as requiring user input, "linearly" is defined as in a straight or nearly straight line, and "translatably" is defined as capable of being transferred from one location or point to another. The legs 110*a-n* may be rotatably and translatably coupled to the tray body 102 for a desired orientation and height with respect to the upper surface 1500 of the grill rack 124. The leg fastener 126 may potentially be a single fastener that is removably coupled to the plurality of legs 110*a-n* using a threaded configuration, a tongue-and-groove configuration, or other coupling configuration. Specifically, the sidewall 106 includes two opposing threaded screws, e.g., screw 152, that are sized and shaped to be received through the slotted apertures on the legs 110*a-n* and removably coupled with fasteners 126.

The grill rack 124 (an exemplary embodiment of which is depicted in FIGS. 6-7 and FIGS. 9-10) may comprise a crisscrossed configuration or may be formed in a matrix as depicted in the figures. In an alternate embodiment, the grill rack 124 may be oriented solely in a parallel or other grilling configuration. These configurations of the grill rack 124 facilitate a stable support of the food products that are placed directly on the upper surface 1500 of the grill rack 124 for infusion while simultaneously allowing any food juices or liquids released during the cooking process to freely escape the grill rack 124 without being pooled or collected therein.

In one embodiment, one or more liquid-injection member(s) 114*a-n* are coupled to the lower surface 118 of the bottom wall 102. The liquid-injection member(s) 114*a-n* define at least on liquid-emission aperture 120 thereon that is fluidly couplable to the at least one infusion plug aperture 108a-n. The liquid-emission aperture 120 may be defined at the distal terminal end of the liquid-emission aperture 120, while in other embodiments the liquid-emission aperture 120 may be defined along a length of the liquid-injection member(s) separating the upper end attached to the tray body and the distal terminal end. In one embodiment, the distal and terminal lower end 144 of the liquid-injection member(s) 114a-n is tapered in thickness to a point or end that allows more effective insertion into the food product. The tapered thickness and point facilitate easier penetration of the food product and insertion of the at least one liquid-injection member 114a-n into the food product. As discussed above, the legs are adjustable in height to allow the food product to be inserted and removed from the grill rack 124 and the distal lower end 144 of the liquid-injection member(s) 114a-n.

Figure 16:
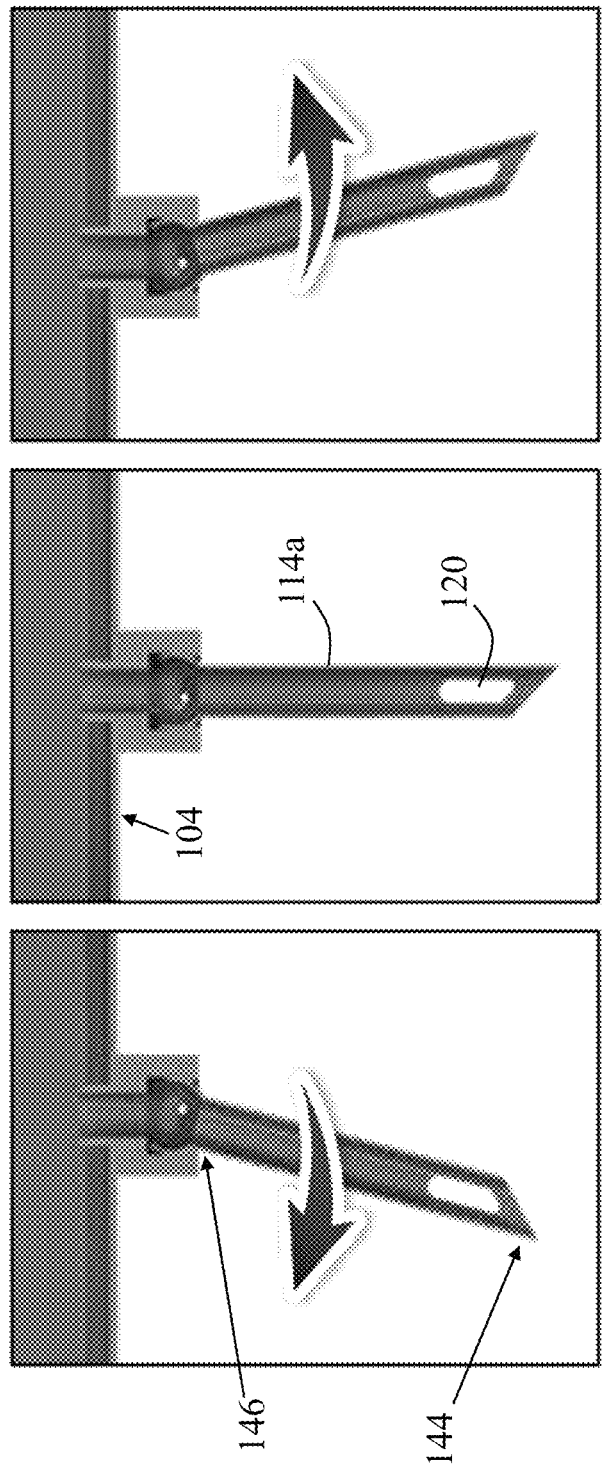
FIG. 16 are elevational, close-up, and sectioned views of a liquid-injection member moved and rotated into various positions along a path, in accordance with an exemplary embodiment of a removable food infuser for a grill assembly.

In one embodiment, the liquid-injection member(s) 114a-n are selectively removably coupled to the tray body 102 using a threaded configuration, enabling effective and safe removal for cleaning. The liquid-injection member(s) 114a-n may also be pivotably (which includes rotationally) coupled to the lower surface 118 of the bottom wall 104 of the tray body 102, thereby facilitating placement versatility of the food substances. Specifically, in one embodiment, the upper end 146 of the at least one liquid-injection member 114a-n forms part of a spherical shape, further comprising an injector fastener 148 with an inner concave surface coupled to the spherical shape of the at least one liquid-injection member 114a-n, wherein the injector fastener 148 is selectively removably coupled to the bottom wall 104 of the tray body 102 in a threaded configuration. As best seen in FIG. 16, the spherical shape allows for greater flexibility of movement of the at least one liquid-injection member 114a-n, i.e., operably configured to selectively rotate 360° relative to the bottom wall 104 of the tray body 102, such that the positioning of the at least one liquid-injection member 114a-n may be readily and selectively manipulated by a user to achieve optimum placement of the at least one liquid-injection member 114a-n within the food products. The rotational position may be locked into place with the fastener 148 or may still be operable to permit rotation.

In accordance with an exemplary embodiment of the present invention, the infuser 100 comprises at least four infusion plugs 112a-n selectively removably coupled to the upper surface 116 of the bottom wall 104 in a watertight configuration and disposed within at least four infusion plug apertures 108a-n. The at least four infusion plugs 112a-n may be disposed in an equally spaced apart configuration; and at least four liquid-injection members 114a-n are each coupled to the bottom wall 104 and each have at least one liquid-emission aperture 120a-n thereon that is fluidly coupled to the injection channel 1302 and fluidly couplable to one of the at least four infusion plug apertures 108a-n. The least four liquid-injection members 114a-n may be operably configured to selectively rotate 360° relative to the bottom wall 104 of the tray body 102. By being equally spaced in the area defined by the upper surface 116 of the bottom wall 104, the at least four infusion plugs 112a-n facilitate a substantially even distribution of the infusion contents throughout the area of the food product to prevent one section of the food product from being infused more or less than another.

The four infusion plugs 112a-n may include an outer shell and inner core 154 permanently and/or removably coupled thereto. When removably coupled, the inner core 154 may serve as a plunger or mechanical means to inject liquid into the injector 114. The inner core 154 may also serve as core for the outer shell to be over-molded thereon.

In alternate embodiment of the present invention, the plurality of infusion plugs 112a-n are permanently coupled or fastened to the upper surface 116 of the bottom wall 104 in a watertight configuration and disposed within the at least one infusion plug aperture 108a-n such that the at least one infusion plug 112a-n is not selectively removable but, instead, operably configured to be selectively adjustable via a valve or other comparable configuration or mechanism to moderate the flow of infusion liquid into the plurality of liquid-injection member 114a-n and, ultimately, into the food products.

In one exemplary method of using the removable infuser for a grill assembly, the user will light a fire in a grill assembly and place the grill rack 124 thereover. The user will then place a marinade liquid or other contents in the body tray 102, the infusion plugs 112, and/or another housing for liquid (whereby the same will raise in temperature when in the grill assembly). Thereafter, the user will place the food substance on the grill and place the tray body 102 thereover (inserting the liquid-injection member(s) 114a-n into the food substance desired to be cooked and infused). In another step, the user will place the tray body 102 in the standing state and laterally or rotationally adjust the legs 110a-n with respect to the tray body 102, thereby lowering the liquid-injection member(s) 114a-n into the food substance. Thereafter, the liquid in the body tray 102, the infusion plugs 112a-n, or another housing for liquid flows downward through gravity or an external force (e.g., selectively adjusting the infusion plugs 112a-n to allow for the flow of more or less liquid, as desired) and into the liquid-injection member(s) 114a-n and into the food substance.

Although a specific order of executing the process steps, the order of executing the steps may be changed relative to the order shown in certain embodiments. Also, two or more steps shown or described as occurring in succession may be executed concurrently or with partial concurrence in some embodiments. Certain steps may also be omitted for the sake of brevity. In some embodiments, some or all of the process steps can be combined into a single process.

What is claimed is:

1. A removable infuser for a grill assembly comprising:
  a tray body having a bottom wall with an upper surface, a lower surface opposing the upper surface, and defining at least one infusion plug aperture thereon, and a sidewall surrounding the bottom wall, the tray body and the sidewall defining a tray cavity;
  a plurality of legs coupled to the tray body and each having a lower support surface and a leg length separating the lower support surface and the lower surface of the bottom wall;
  at least one infusion plug selectively removably coupled to the upper surface of the bottom wall in a watertight configuration and disposed within the at least one infusion plug aperture; and
  at least one liquid-injection member coupled to the bottom wall, with a lower end, an upper end defining an upper aperture, an injector length separating the lower and upper ends of the at least one liquid-injection member, an injection channel spanning along the injector length and fluidly coupled to the upper aperture, and defining at least one liquid-emission aperture thereon that is fluidly coupled to the injection channel and fluidly couplable to the at least one infusion plug aperture, the at least one liquid-injection member operably configured to selectively rotate 360° relative to the bottom wall of the tray body.

2. The removable infuser for a grill assembly according to claim 1, wherein:
one of the plurality of legs is coupled to the sidewall on a left side of the tray body and another of the plurality of legs is coupled to the sidewall on a right side of the tray body, the left side of the tray body opposing the right side of the tray body and the plurality of legs each operably configured to selectively rotate and selectively translate to modify the leg length.

3. The removable infuser for a grill assembly according to claim 2, wherein the lower support surface of each of the plurality of legs each further comprise:
an enclosed leg aperture defined thereon.

4. The removable infuser for a grill assembly according to claim 3, further comprising:
a grill rack with a plurality of grill rack members of a substantially rigid material and defining a grid defining a grill plane, with having two opposing handles, and with a first plurality of protrusion member(s) disposed proximal to one of the two opposing handles and a second plurality of protrusion members disposed proximal to other of the two opposing handles, the first and second plurality of protrusion members each disposed in an upright orientation with respect to the grill plane and shaped and sized to be received within the enclosed leg aperture of each of the plurality of legs.

5. The removable infuser for a grill assembly according to claim 4, wherein:
the first plurality of protrusion members are disposed in an axially aligned configuration and the second plurality of protrusion members are disposed in an axially aligned configuration parallel to the axially aligned configuration of the first plurality of protrusion members.

6. The removable infuser for a grill assembly according to claim 1, wherein:
the plurality of legs are each selectively rotatably coupled to the tray body to define a leg rotation path and selectively, linearly, and translatably coupled to the tray body to define a leg translation path, the plurality of legs each operably configured to be selectively locked in a rotational position along the leg rotation path and an adjusted length position along the leg translation path with a leg fastener.

7. The removable infuser for a grill assembly according to claim 1, wherein the at least one infusion plug further comprises:
a lower end, an upper end, and a plug length separating the lower and upper ends of the infusion plug, the plug length is approximately equal to or greater than a sidewall height separating the upper surface of the bottom wall and an upper edge of the sidewall.

8. The removable infuser for a grill assembly according to claim 7, wherein the at least one infusion plug further comprises:
a plurality of gripping ridges disposed proximal to the upper end of the at least one infusion plug.

9. The removable infuser for a grill assembly according to claim 1, wherein:
the lower end of the at least one liquid-injection member tapers in thickness to a point.

10. The removable infuser for a grill assembly according to claim 1, wherein the upper end of the at least one liquid-injection member forms part of a spherical shape, further comprising:
an injector fastener with an inner concave surface coupled to the spherical shape of the at least one liquid-injection member, the injector fastener selectively removably coupled to the bottom wall of the tray body in a threaded configuration.

11. The removable infuser for a grill assembly according to claim 1, wherein:
the injector length is less than the leg length.

12. The removable infuser for a grill assembly according to claim 1, further comprising:
at least four infusion plugs selectively removably coupled to the upper surface of the bottom wall in a watertight configuration and disposed within at least four infusion plug apertures, the at least four infusion plugs disposed in an equally spaced apart configuration; and
at least four liquid-injection members each coupled to the bottom wall and each having at least one liquid-emission aperture thereon that is fluidly coupled to the injection channel and fluidly couplable to one of the at least four infusion plug apertures, the least four liquid-injection members operably configured to selectively rotate 360° relative to the bottom wall of the tray body.

13. A removable infuser for a grill assembly comprising:
a tray body having a bottom wall with an upper surface, a lower surface opposing the upper surface, and defining at least one infusion plug aperture thereon, and a sidewall surrounding the bottom wall, the tray body and the sidewall defining a tray cavity;
a plurality of legs coupled to the tray body and each having a lower support surface and a leg length separating the lower support surface and the lower surface of the bottom wall;
at least one infusion plug coupled to the upper surface of the bottom wall in a watertight configuration and disposed within the at least one infusion plug aperture; and
at least one liquid-injection member coupled to the bottom wall, with a lower end, an upper end defining an upper aperture, an injector length separating the lower and upper ends of the least one liquid-injection member, an injection channel spanning along the injector length and fluidly coupled to the upper aperture, and defining at least one liquid-emission aperture thereon that is fluidly coupled to the injection channel and fluidly couplable to the at least one infusion plug aperture, the at least one liquid-injection member operably configured to selectively rotate 360° relative to the bottom wall of the tray body.

14. The removable infuser for a grill assembly according to claim 13, wherein:
the at least one infusion plug is selectively removably coupled to the upper surface of the bottom wall.

15. The removable infuser for a grill assembly according to claim 13, wherein:
one of the plurality of legs is coupled to the sidewall on a left side of the tray body and another of the plurality of legs is coupled to the sidewall on a right side of the tray body, the left side of the tray body opposing the right side of the tray body and the plurality of legs each operably configured to selectively rotate and selectively translate to modify the leg length.

16. The removable infuser for a grill assembly according to claim 13, wherein the lower support surface of each of the plurality of legs each further comprise:
- an enclosed leg aperture defined thereon.

17. The removable infuser for a grill assembly according to claim 13, further comprising:
- a grill rack with a plurality of grill rack members of a substantially rigid material and defining a grid defining a grill plane, with having two opposing handles, and with a first plurality of protrusion member(s) disposed proximal to one of the two opposing handles and a second plurality of protrusion members disposed proximal to other of the two opposing handles, the first and second plurality of protrusion members each disposed in an upright orientation with respect to the grill plane and shaped and sized to be received within the enclosed leg aperture of each of the plurality of legs.

18. The removable infuser for a grill assembly according to claim 17, wherein:
- the first plurality of protrusion members are disposed in an axially aligned configuration and the second plurality of protrusion members are disposed in an axially aligned configuration parallel to the axially aligned configuration of the first plurality of protrusion members.

19. The removable infuser for a grill assembly according to claim 13, wherein:
- the plurality of legs are each selectively rotatably coupled to the tray body to define a leg rotation path and selectively, linearly, and translatably coupled to the tray body to define a leg translation path, the plurality of legs each operably configured to be selectively locked in a rotational position along the leg rotation path and an adjusted length position along the leg translation path with a leg fastener.

20. The removable infuser for a grill assembly according to claim 13, wherein the at least one infusion plug further comprises:
- a lower end, an upper end, and a plug length separating the lower and upper ends of the infusion plug, the plug length is approximately equal to or greater than a sidewall height separating the upper surface of the bottom wall and an upper edge of the sidewall.

* * * * *